United States Patent [19]

Mowat et al.

[11] 4,452,327

[45] Jun. 5, 1984

[54] MOTORIZED VEHICLE

[76] Inventors: Donald J. Mowat; H. Michael Doman, both of P.O. Box 1031, Kitchener, Ontario, Canada, N2G 4E3

[21] Appl. No.: 250,140

[22] Filed: Apr. 3, 1981

[30] Foreign Application Priority Data

Nov. 6, 1980 [CA] Canada .................................. 364194

[51] Int. Cl.³ .......................... B62D 27/06; B62K 5/06
[52] U.S. Cl. ....................................... 180/11; 180/208;
180/907; 188/29; 280/242 WC; 280/287;
280/DIG. 5; 301/128; 403/373
[58] Field of Search ..................... 180/13, 12, 11, 211,
180/208, DIG. 3, 214; 301/128; 188/29;
280/202, 287, 639, 111, DIG. 5, 289 R, 242
WC, 289 WC, 642; 403/373

[56] References Cited

U.S. PATENT DOCUMENTS

| 722,262 | 3/1903 | Stone | 180/12 |
|---|---|---|---|
| 3,229,782 | 1/1966 | Hilton | 180/208 |
| 3,289,780 | 12/1966 | Ferris | 180/214 |
| 3,506,080 | 4/1970 | Hott | 180/214 |
| 3,570,620 | 3/1971 | Fisher | 180/214 |
| 3,605,929 | 9/1971 | Rolland | 180/208 |
| 3,738,440 | 6/1973 | Storm | 180/13 |
| 3,912,032 | 10/1975 | Benz et al. | 180/13 |
| 3,921,744 | 11/1975 | Benoit et al. | 180/13 |
| 3,939,931 | 2/1976 | Benz | 180/13 |

FOREIGN PATENT DOCUMENTS

| 82115 | 1/1899 | Canada . |
|---|---|---|
| 294255 | 10/1929 | Canada . |
| 331917 | 4/1933 | Canada . |
| 557283 | 5/1958 | Canada . |
| 567716 | 12/1958 | Canada . |
| 631282 | 11/1961 | Canada . |
| 742939 | 9/1966 | Canada . |
| 923045 | 3/1973 | Canada . |
| 954438 | 9/1974 | Canada . |
| 1097434 | 2/1955 | France | 180/13 |
| 1030322 | 5/1966 | United Kingdom | 180/12 |

Primary Examiner—Joseph F. Peters, Jr.
Assistant Examiner—Mitchell J. Hill
Attorney, Agent, or Firm—Brumbaugh, Graves, Donohue & Raymond

[57] ABSTRACT

There is described a connecting assembly for a light weight vehicle having mutually engageable hook and latch portions wherein the hook portion comprises engaging hooks to engage and lift the latch means, the engaging portion further including a shoulder to cause the subsequent disengagement of the latch and engaging portions, support hooks to receive the latch portion upon its disengagement from the engagement hooks, and a levered handle actuatable to cause displacement of the latch portion from the support hooks.

61 Claims, 15 Drawing Figures

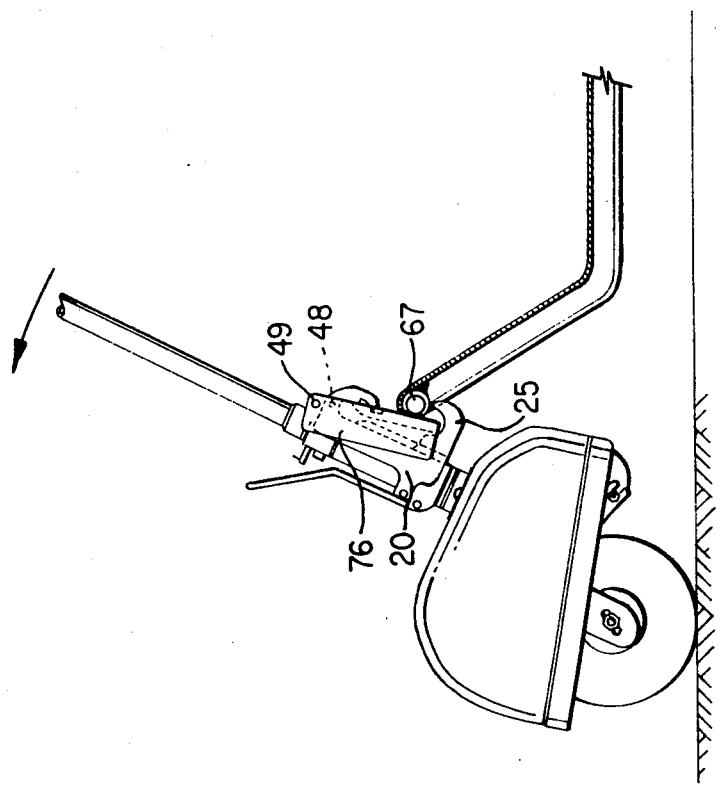
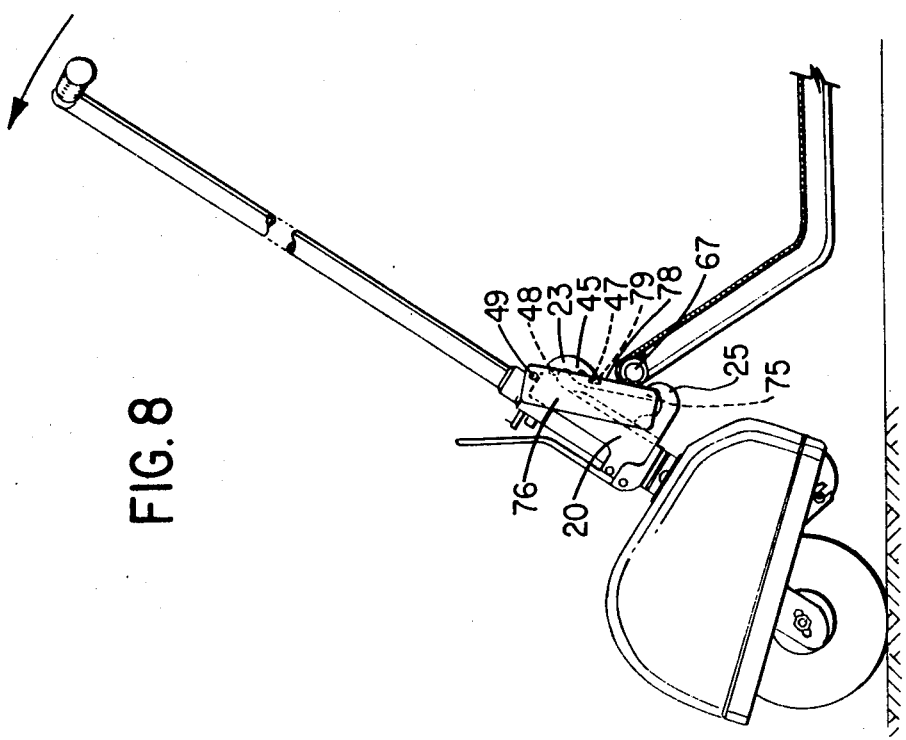

MOTORIZED VEHICLE

BACKGROUND OF THE INVENTION

The present invention relates to improvements to motorized vehicles and finds particular appplication on those types of vehicles, such as electric wheelchairs, employed by the handicapped to provide added mobility.

It will be appreciated that although the description of the invention that follows hereinafter is made with reference to electrified wheelchairs, the invention finds application on all manner of motorized carts such as may be found in the workplace, on the golf course, and so on.

Motorized wheelchairs of the same general configuration as described and illustrated herein are known. Such wheelchairs, however, possess a number of disadvantages in their construction and operation which pose substantial difficulties for their users. Some units can be disassembled only to a limited extent, such as by removing the chair portion from the motorized platform. The platform, comprising the unit's suspension, batteries, motors and drive train, is usually far too heavy and bulky to be wielded by the actual user, requiring that an attendant be on hand to assist in loading the wheelchair into an automobile for transport or to remove it up a flight of stairs, for instance. Other units can be broken down into a greater number of parts although the disassembly procedure requires that the operator bend at the knees and perform a number of operations requiring a high degree of manual dexterity. Again, such actions are often beyond the capabilities of the user. It will be appreciated that similar difficulties are encountered when the wheelchair is to be reassembled.

Other disadvantages encountered with known motorized wheelchairs occur with respect to difficult-to-operate seat clamping and braking mechanisms.

Further, because these vehicles by their very nature possess a relatively high centre of gravity, grades and inclines beyond a predetermined threshold cannot be traversed with safety. The attempted solution to this problem or known vehicles has been to provide add-on items including additional axles and wheels to widen the stance or track of the wheelchair. Such add-on apparatus has proven awkward and cumbersome to install and use, requiring the use of special tools such as retaining ring pliers and once again necessitating a degree of physical dexterity often not possessed by the handicapped user. The attempted solutions have moreover been deficient in not providing a means to concurrently lengthen the wheelbase of the chair.

SUMMARY OF THE INVENTION

Accordingly, it is an object of the present invention to provide an improved electrified vehicle which obviates and mitigates from the disadvantages of prior art wheelchairs.

It is also an object of the present invention to provide an improved electrified wheelchair having a connecting assembly with mutually engageable hook and latch means wherein said hook and latch means are mutually engageable and disengageable with a minimum of trouble and effort on the part of a handicapped user.

It is a further object of the present invention to provide an improved electrified vehicle having an improved seat clamping mechanism including a clamp actuating lever actuatable in the vertical plane for easy operation by the user of the vehicle.

It is a further object of the present invention to provide an electrified vehicle including an improved brake mechanism which is easy to actuate by the chair's operator and is readily visible by said operator when seated upon the vehicle.

It is yet another object of the present invention to provide an improved electrified vehicle having a telescopic rear axle to provide enhanced operability and improved stability.

It is yet another object of the present invention to provide an improved electrified vehicle including a drive assembly comprising a plurality of drive motors disposed adjacent a drive wheel of the vehicle.

According to the present invention, then, there is provided a connecting assembly for a light-weight vehicle having mutually engagable hook and latch means wherein the hook means comprise engaging means to engage and lift the latch means, the engaging means further including shoulder means to cause the progressive disengagement of the latch and engaging means; support means to engagedly receive the latch means upon disengagement thereof from the engaging means; and lever means actuatable to cause disengagement between the latch means and the support means.

According to the present invention there is also provided a clamping mechanism to prevent the rotation of a first tubular member relative to a telescopically associated second tubular member, the mechanism comprising collar means connected to the first tubular member; clamp means to partially encircle the second tubular member; means connecting the collar and clamp means; rod means pivotally connected to and projecting outwardly from one side of the clamp means at an incline relative to the longitudinal axis of the tubular members in a direction towards the collar means; and lever means pivotally connected between the side of the clamp means opposite to the one side thereof and the outwardly extending portion of the rod means, wherein the lever means are actuatable in the plane of the longitudinal axis to increase the angle of incline of the rod means relative to the axis, thereby causing the clamp means to constrict about the second tubular member.

According to a further aspect of the present invention, there is provided a brake to prevent the rotation of a wheel, the brake comprising brake mounting means having housing means attached thereto provided adjacent the wheel; and a cam member pivotally supported by the housing means, the cam member being actuatable between a braking and a releasing position.

According to yet another aspect of the present invention there is provided a telescopic axle assembly for use on vehicles comprising, when viewed in plan, a V-shaped axle housing, the arms of said V projecting rearwardly of the vehicle; and axle members adjustably received into the axle housing to be extensible and retractable relative thereto to both lengthen the wheel base and widen the track of the vehicle.

According to yet another aspect of the present invention there is provided a drive assembly for mounting a plurality of drive motors adjacent a drive wheel comprising bracket means having a first lower portion supporting the wheel and a second portion disposed above the wheel at an angle relative thereto, the second portion being adapted at its ends to receive the motors; shaft means disposed between the motors and connected thereto for rotation of the shaft; and connecting means disposed between the shaft and the wheel to transmit power to the wheel.

BRIEF DESCRIPTION OF THE DRAWINGS

Embodiments of the invention will now be described in greater detail and will be better understood when read in conjunction with the following drawings in which:

FIGS. 5 to 9 are side elevational, partially sectional views showing the assembly and disassembly of the connecting mechanism of FIGS. 2 to 4;

DESCRIPTION OF PREFERRED EMBODIMENTS

Figure 1:
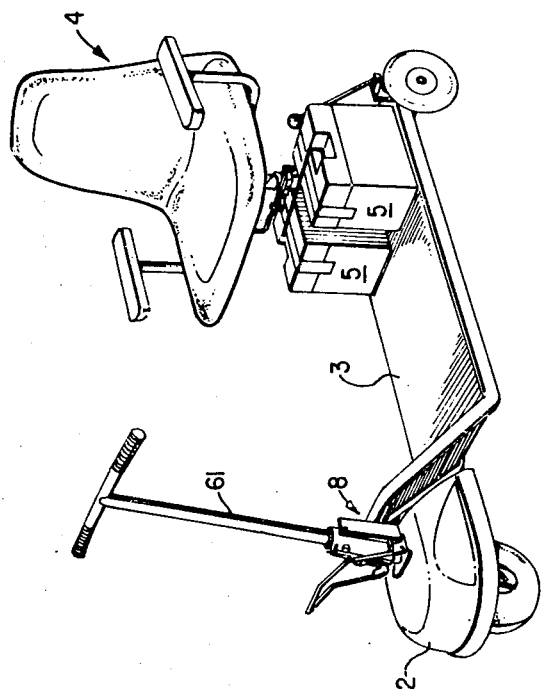
FIG. 1 is a perspective view of a motorized wheelchair as described herein.

Referring now to FIG. 1, there is shown generally a motorized wheelchair comprising a detachable front end drive wheel assembly including power head 2, connecting mechanism 8 and steering column 61 with handle bars attached, a trailer or platform 3, a detachable swivel seat 4 and batteries 5.

Figure 2:
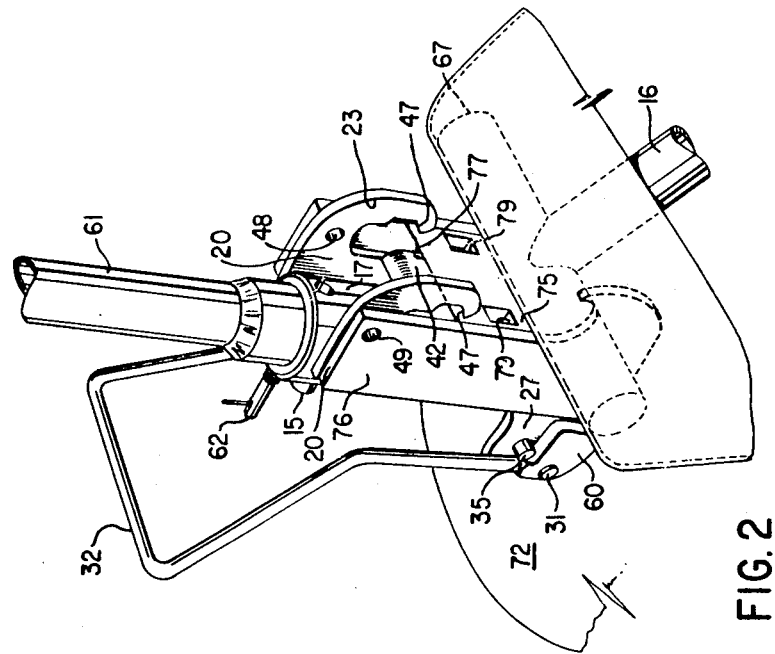
FIG. 2 is a rear perspective view of the connecting assembly for use on the wheelchair of FIG. 1.
Figure 3:
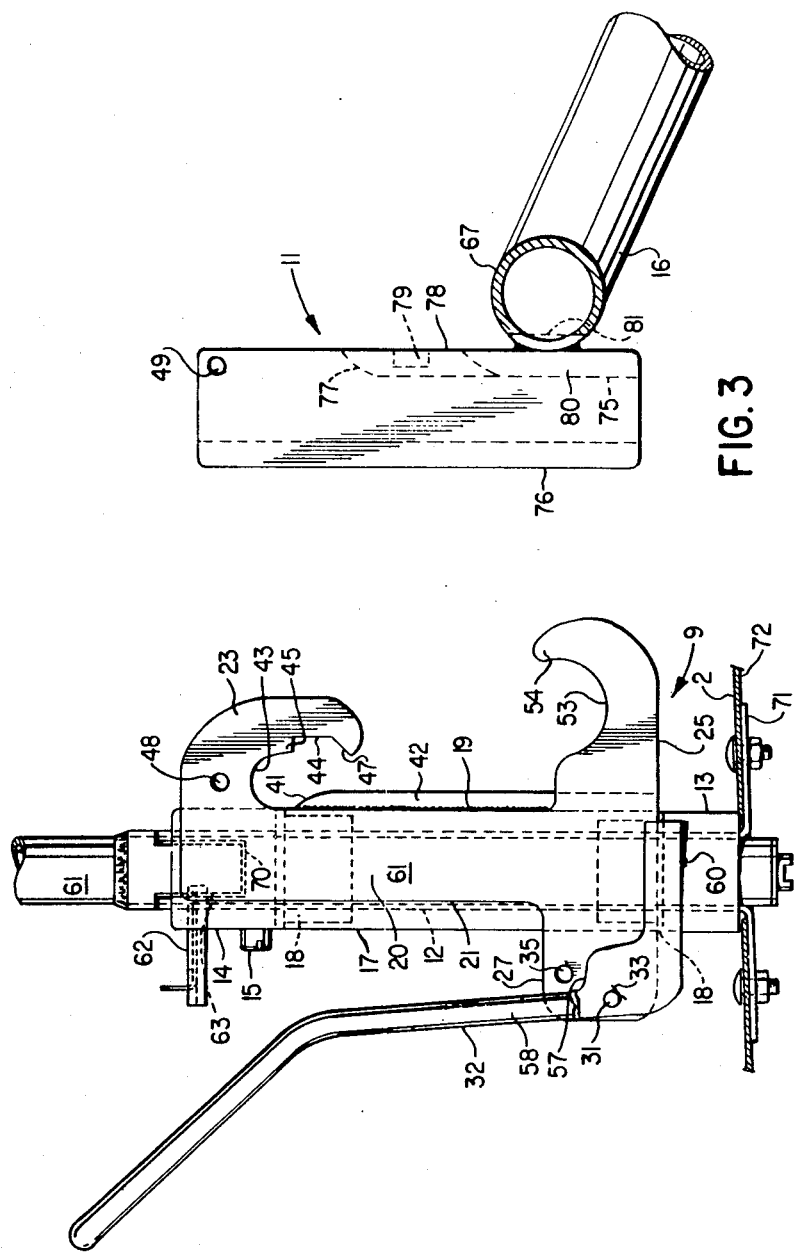
FIG. 3 is a side elevational, partly sectional view of the disengaged hook and latch subassemblies forming the connecting assembly of FIG. 2.

Connecting the front end assembly to platform 3 is a connecting mechanism 8 as shown in FIGS. 2 and 3. The connecting mechanism consists primarily of a hook assembly 9 and a latch portion 11. Latch portion 11 is fixedly attached to the wheelchair frame 16, details of which will be provided below.

With specific reference now to FIGS 2 and 3, hook assembly 9 consists of a tubular sleeve 17 having nylon bushings 18 fitted into each end thereof. Affixed to opposite sides of sleeves 17, such as by welding, are first and second parallel plate members or hook plates 20 arranged tangentially to sleeve 17. Extending between plates 20 and connected thereto is a tranverse plate 42 which extends vertically from the bottom of plates 20 upwardly to a point just opposite hooks 23. Plate 42 may be tangential to sleeve 17. Each plate 20 is formed having engaging means projecting from an upper end thereof, the engaging means comprising an engaging hook member 23 which curves or hooks in the direction towards the opposite, lower end of the plate, a support hook 25 extending in one direction from the lower end of the place and which curves in a direction towards hook 23 and a flange 27 projecting in the direction opposite to support hook 25. Plates 20 are arranged to parallel one another so that the said hook and flange members formed thereon are aligned with one another.

Engaging hooks 23 are each formed to have an inner surface 43 which defines an opening between the hook and the plate 20 from which it projects and a recess 44 formed proximal to the lowermost ends which opens into the periphery of the said opening. Recess 44 is defined by an upper edge which intersects the periphery of the opening at substantially a right angle to form a shoulder 45 and an engaging surface 47, the function of which will be described below. Apertures 48 are formed into hooks 23. When the hook assembly is mated with latch assembly 11, apertures 48 align with apertures 49 formed into retaining plates 76 which form part of the latch assembly. A retractable pin may be inserted into the apertures to ensure the continuous engagement of the hook assembly to the latch assembly.

Supporting hooks 25 are formed about the lower ends of hook plates 20. Radius 53 is intended to receive and support tubular frame member 67 when the hook and latch assemblies are engaged. Accordingly, the diameter of the support hook is just slightly in excess of that of frame member 67. Curved arm 54 of hook 25 extends upwardly to envelop slightly more than half of frame member 67.

Projecting in the direction opposite hooks 25 are flanges 27. Axially aligned holes are formed in the flange to receive a hinge pin 31 about which handle 32 is rotatably mounted. Stops 35 project outwardly from the flanges to engage shoulder portions 57 of handle 32, limiting the rotational movement of the handle in the counter clockwise direction. Stop 35 engages handle arm 58 to limit the clockwise rotational movement of the handle. Handle 32 further includes lower levers 60 which project towards latch portion 11. It will be seen from the drawings that the handle is mounted so that the lower portions thereof, including arms 60, bracket the lower portions of hook plates 20. The handle is retained about hinge pin 31 by means of circlips 33 or by any other suitable means of attachment.

The hook assembly as described above is mounted on power head 2 as follows. Fixedly connected to the power head and projecting upwardly therefrom is a tubular core 12. A spacer 13 is fitted over core 12 to rest against plate 71 fixedly connected to the cowling 72 of the power head. Tubular core 12 is connected at its lower end to plate 71 by welding or it may be integrally formed therewith. Hook assembly 9 is then fitted over core 12 to rest against spacer 13. The hook assembly is oriented so that handle 32 projects forwardly of the wheelchair. Lastly, a retaining sleeve 14 is fitted over the core. A set screw 15 is provided to connect sleeve 14 to tubular core 12. It will be appreciated that nylon bushings 18 facilitate the rotational movement of sleeves 13 and 14 and core 12 relative to hook assembly 9.

To complete the front end assembly, steering column 61 is received into core 12 to be held in place therein by means of release pin 62. Rotational movements imparted to the steering column are transmitted to core 12 and hence to power head 2 itself by means of tabs 63 formed onto the steering column which engage notches 70 formed into tubular core 12.

Turning now to latch assembly 11, the assembly includes a latch plate 75 rigidly affixed to tubular frame member 67. Affixed to the sides of latch plate 75 to be flush mounted with rear surface 78 thereof are third and fourth plate members being retaining plates 76. Plates 76 are disposed in parallel alignment. Plate 75 is of a width such that plates 76 are spaced sufficiently far apart to receive hook plates 20 therebetween when the connecting mechanism is in the engaged position. The inner leading edges of retaining plates 76 are beveled to facilitate the entry of hook assembly 9 between the plates. Plate 75 extends vertically from the bottom of retaining plates 76 to a point approximately opposite the lowermost extent of engaging surface 47 on engaging hook 23. The uppermost portion of the plate is rounded as shown at 77 in the drawings. Formed into rear surface 78 of plate 75 is a horizontally extending notch 79 of rectangular cross-sectional configuration. Longitudinally extending slots 80 are formed into plate 75 adjacent retaining plates 76 to allow for the passage of support hooks 25 therethrough.

The portions of frame member 67 aligned with slots 80 are notched to form colinear slots 81.

Figure 4:
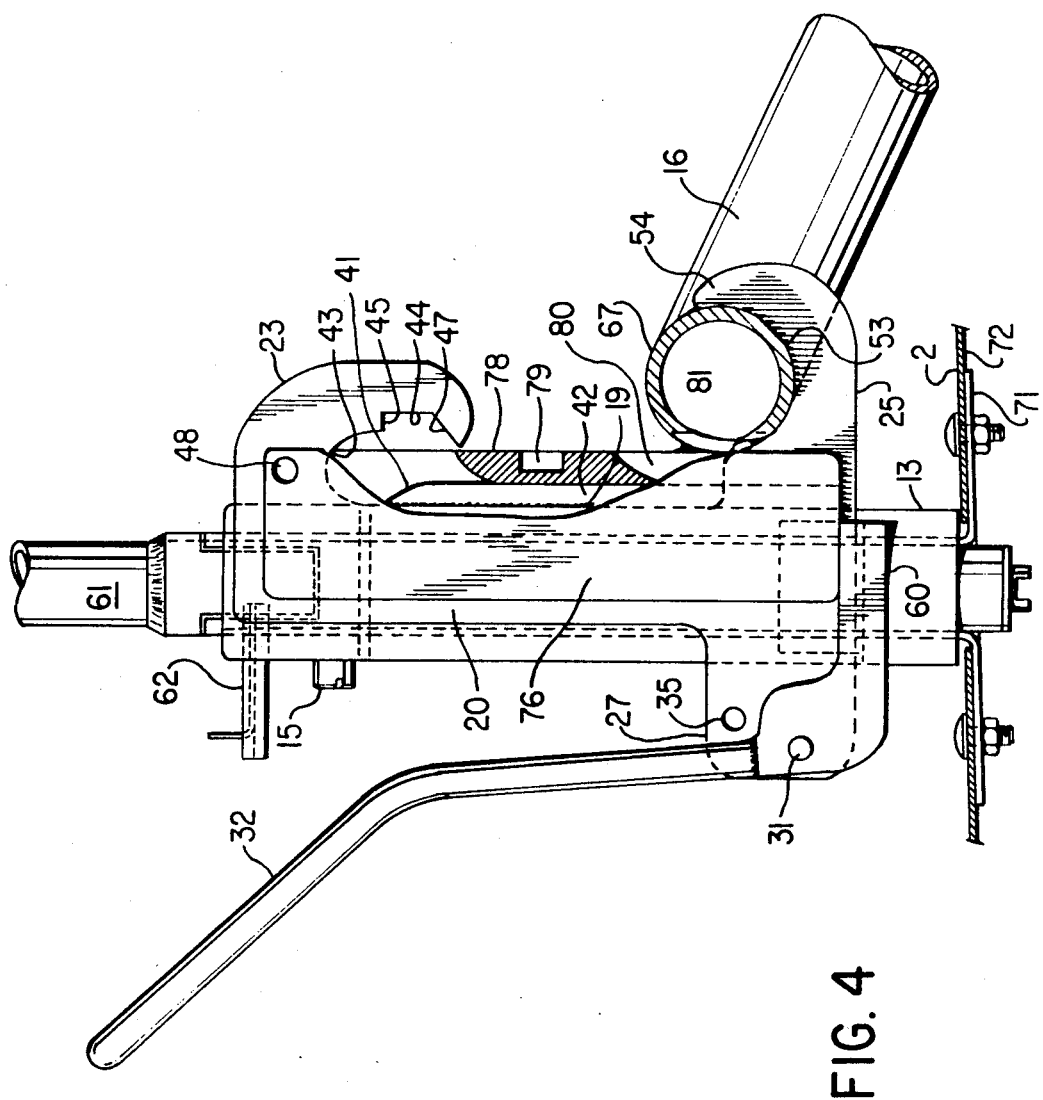
FIG. 4 is a side elevational, partially sectional view of the connecting mechanism of FIG. 3 in the engaged position thereof.

Referring now to FIGS. 2 and 4 showing hook assembly 9 in engagement with latch assembly 11, it will be seen that in the engaged position hook assembly 9 is received between retaining plates 76 and tubular frame member 67 is received into and is supported by hook 25 with arms 54 of the hook wrapping around tubular frame member 67 to prevent disengagement under load conditions. It will be appreciated that under load, the downwardly directed component of the load forces will tend to cause an outward splaying of the power head and steering column assembly away from base 3 of the wheelchair. This tendency is resisted by the extent of curvature of arms 54 about tube 67 and also by the reactive forces between plates 42 and 75 which are brought into contact by the engagement by the hook and latch assemblies. In other words, the cradling of tube 67 within hook 25 maintains hook assembly 9 in engagement with latch assembly 11 whereas the contact between the plates 42 and 75 prevents rotational movement of the hook assembly about tube 67. Further, the contact between plates 42 and 75 ensures proper upright alignment of the front end assembly relative to the remainder of the wheelchair.

Also in the engaged position, the upper surfaces of release levers 60 rest in close proximity to the lower surfaces of retaining plates 76, it being appreciated that the distance between release levers 60 is substantially equal to the distance between retaining plates 76.

In the engaged position, hook assembly 9 is held stationary between plates 76. Steering column 61 and tubular core 12 rotate within sleeve 17 to effect the steering movements of power head 2. As previously mentioned, retaining sleeve 14 is connected to the steering column by means of a set screw 15 so that sleeve 14 rotates relative to assembly 9. The extent of rotation of sleeve 14 and hence that of column 61 is therefore limited due to contact between set screw 15 and hook plates 20, thereby preventing the inadvertent over-rotation of the power head which could cause an upset of the wheelchair.

Figure 5:
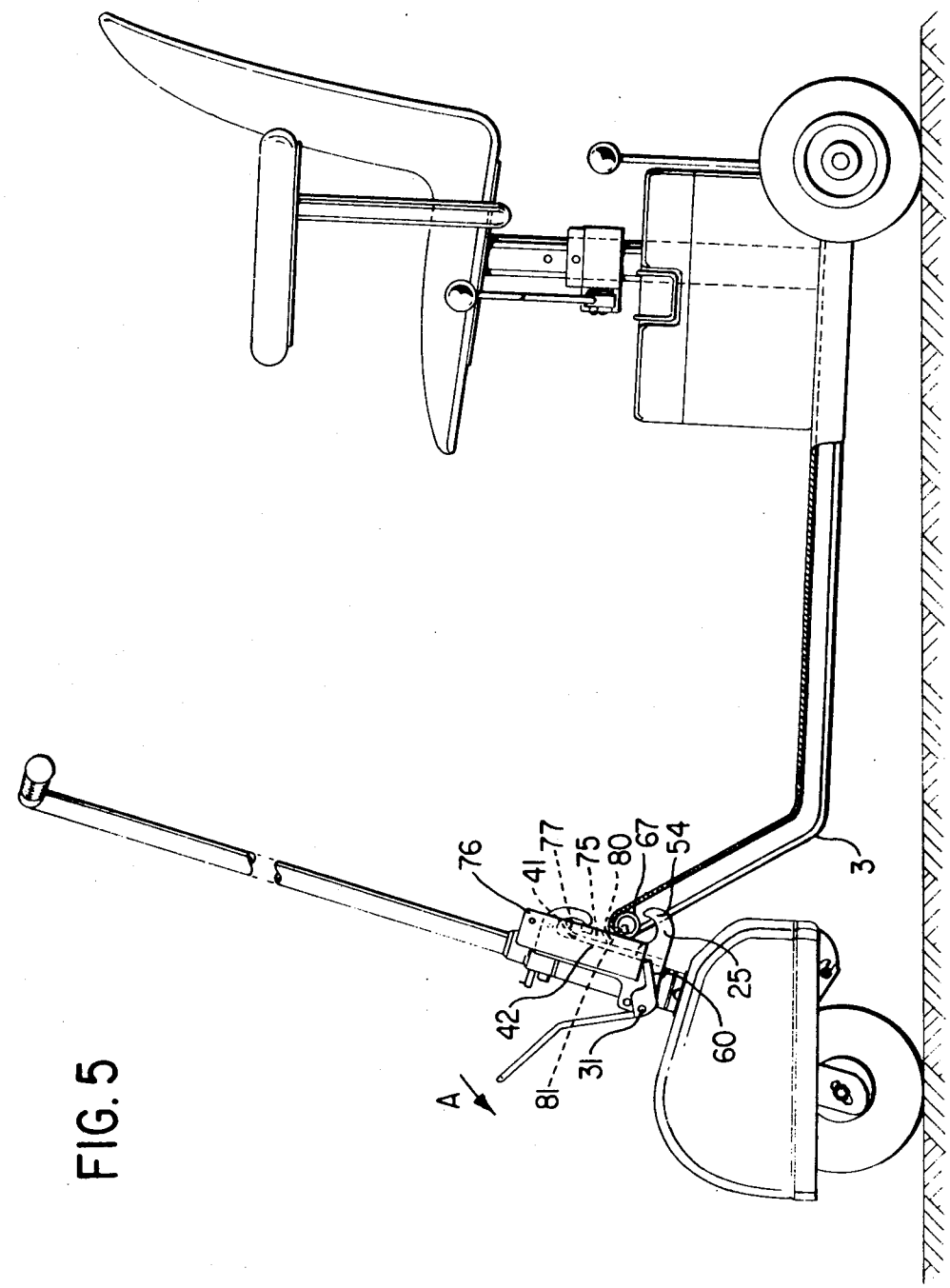
Figure 6:
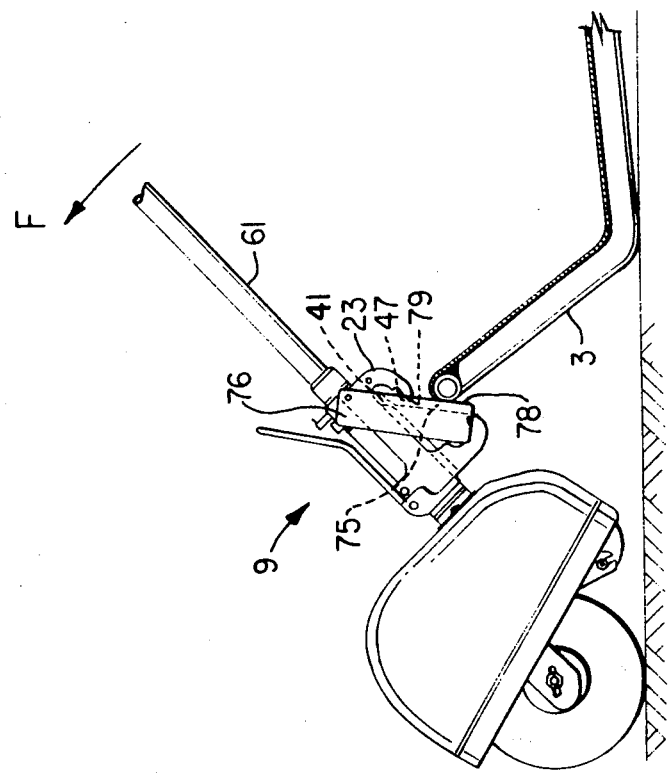
Figure 7:
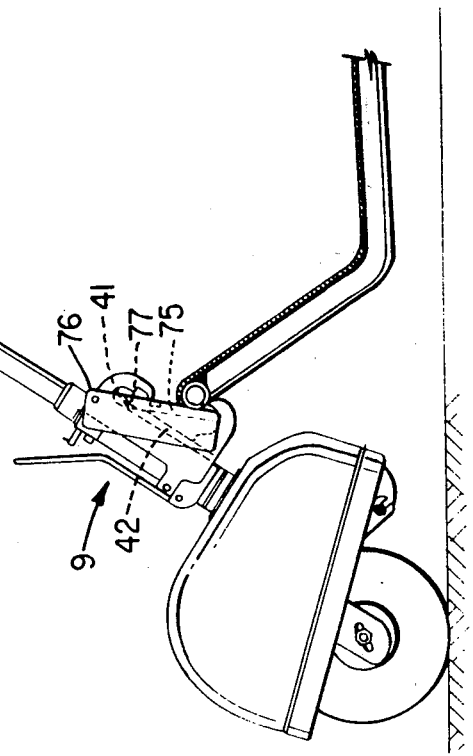

Referring now to FIGS. 4, 5 and 7, to disassemble the front end assembly from the remainder of the wheelchair, it is necessary to merely depress handle 32 in the direction indicated by Arrow A in FIG. 5. The handle pivots about hinge 31 so that release lever 60 acts to boost retaining plates 76, and thus the frame of the wheelchair to which they are attached, upwardly, causing tubular frame member 67 to disengage from support hook 25. As frame member 67 disengages from the support hook, the power head begins to splay outwardly from platform 3, pivoting about the rounded portion 41 of plate 42. As disengagement continues, curved arm 54 of hook 25 inscribes a path about the bottom of tubular member 67 until it passes the midway point thereof and member 67 begins to slide downwardly past curved arm 54. As it does so, curved arm 54 passes through notches 80 and 81 formed into plate 75 and member 67 respectively to thereby facilitate a smooth disassembly movement. As the process continues, plate 75 passes downwardly relative to plate 42 so that the outward splaying of the power head continues about the rounded portion 77 of plate 75. When platform 3 comes to rest on the ground, disassembly is complete. Retaining plates 76 continue to bracket hook assembly 9 so that the front end assembly as a whole does not fall off to either side and so that the steering column continues to project upwardly and rearwardly where it may be easily grasped. To remove the front end assembly including the power head, the user need only lift the assembly using handle 32 or the steering column, whereupon the power head comes completely away for easy transport. Alternatively, the front end assembly may be pushed forwardly relative to the remainder of the wheelchair to thereby effect its removal without the need for lifting. It will be appreciated that the whole disassembly procedure requires only a second or two of time and a minimum amount of exertion by the operator who need only bend at the waist to depress handle 32 to initiate the disassembly procedure.

To reassemble the front end assembly to the platform, reference is made to the procedure illustrated in FIGS. 7, 8 and 9. The hook assembly 9 is first guided between retaining plates 76 so that steering column 61 is inclined towards the rear of the wheelchair. By giving a little push to the steering column in a direction substantially parallel to the longitudinal axis thereof, engaging surface 47 of engagement hook 23 enters notch 79 formed into the rear surface 78 of plate 75. Steering column 61 is then rotated in the direction indicated by arrow F so that engagement surface 47 engages the uppermost surface of notch 79 as shown. As the steering column continues to be righted, platform 3 is lifted off the ground and is drawn towards the power head. As the rotation of the steering column continues, shoulder 45 of hook 23 contacts rear surface 78 of plate 75 and begins to lever engagement surface 47 out of notch 79. This disengagement process continues even as tubular member 67 is drawn into a position over support hook 25. Finally, surface 47 is levered completely out of contact with notch 79 and the platform drops, whereupon tubular member 67 is caught by support hooks 25 to be cradled therein. Assembly in now complete. Again, the entire process requires only seconds of time and the operator need hardly even bend at the waist. As discussed above, the hook and latch assemblies are now completely self secured and in a condition to be loaded. As a safety precaution, however, a retractable pin may be inserted through apertures 48 and 49 formed into hook and retaining plates 20 and 76, respectively.

It will be appreciated that although the present connecting mechanism has been described in the context of an electric wheelchair in view of its obvious advantages to the handicapped or partially handicapped person, the connecting mechanism will fine application on all manner of carts or motorized vehicles which are amenable to disassembly.

To lend added utility to a wheelchair of the type referred to herein, it has proven useful to provide a seat which swivels. This provides for easier ingress and egress of the user and also allows the operator to draw up along side a desk or work surface and pivot his feet underneath. Many other advantages accrue as are well known in the art. For safety reasons, however, it has been found desirable to provide a seat clamping mechanism to prevent rotation of the seat particularly when the wheelchair is being driven. The disadvantages of known clamps are that the clamp lever, the operating handle or knob of which is typically located beneath or beside the seat, must be moved laterally in a direction substantially parallel to the ground. Given the forces required to do so, many handicapped persons find it most difficult to generate the necessary strength to cause this lateral motion. Such persons, however, have little or no difficulty in generating sufficient force with which to depress a clamping lever, particularly as body weight can be brought to bear for this purpose.

Figure 10:
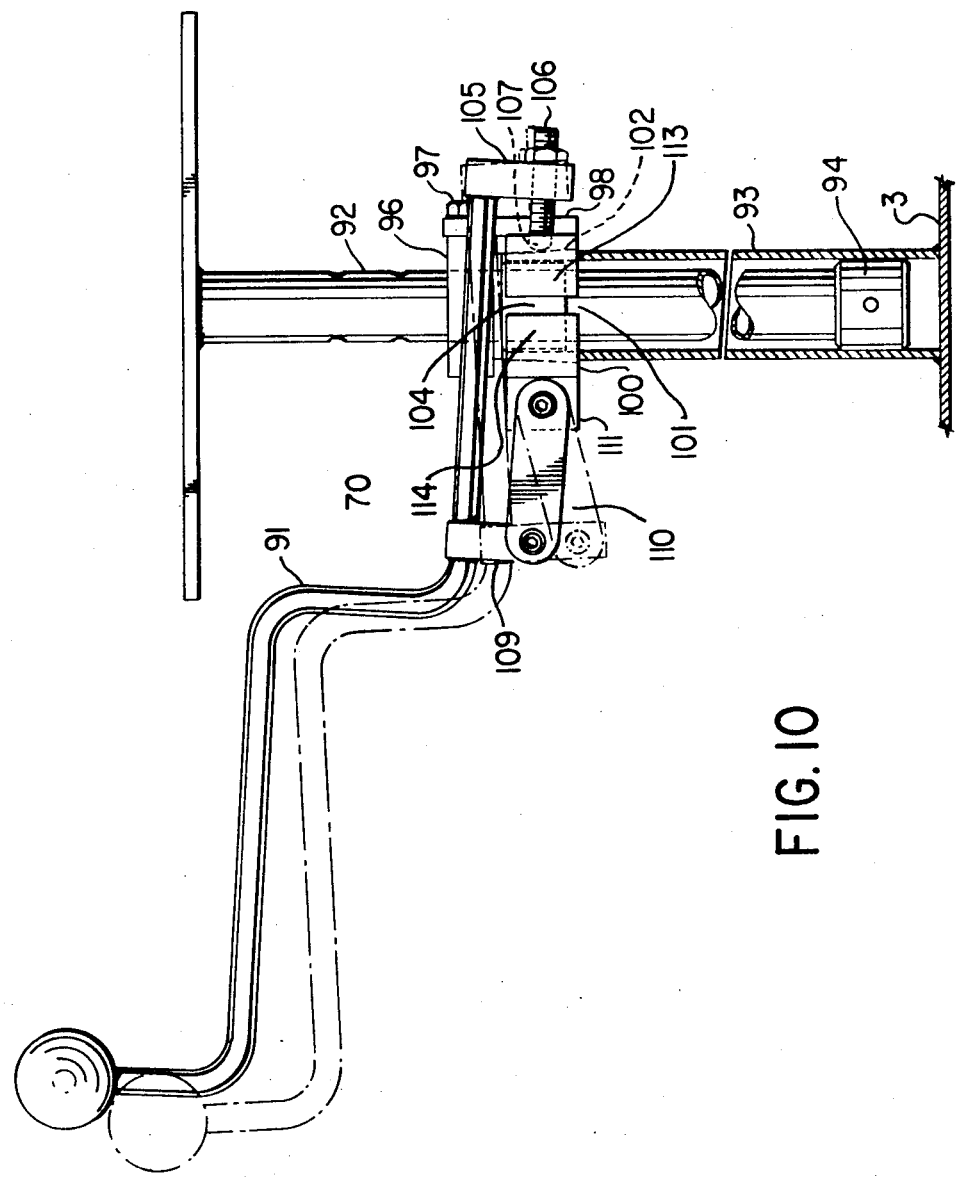
FIG. 10 is a side elevational view of the seat clamping mechanism described herein.
Figure 11:
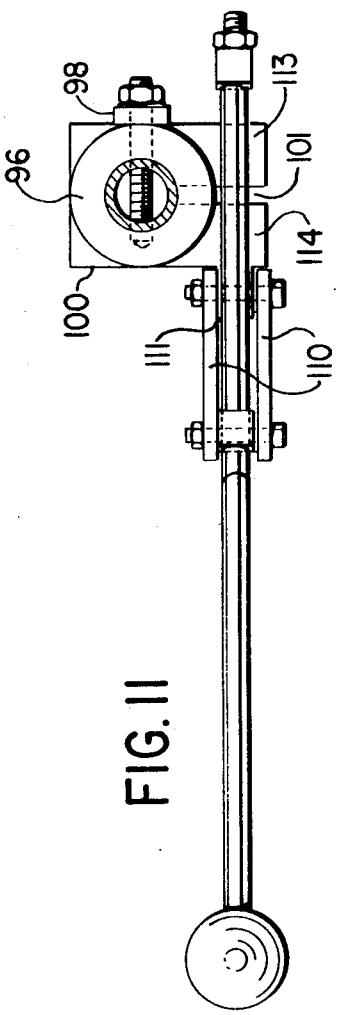
FIG. 11 is a plan view of the seat clamping mechanism of FIG. 10.

Referring now to FIGS. 10 and 11, there is illustrated therein an improved clamping mechanism 90 operable by means of a lever 91 actuatable in the vertical plane to facilitate its use.

Clamp 90 is mounted about seat column 92. Column 92 is in turn received into a tubular sleeve 93 which is fixedly connected to platform 3 and projects upwardly therefrom. Fitted about the lower end of column 92 is a nylon bushing 94 which is slidably and rotatably received into sleeve 93.

The clamp itself includes a collar 96 fastened about column 92 by means of a set screw 97. As the position of the collar 96 determines the actual height of the swivel seat, a number of holes may be provided up and down the column to receive the set screw. Depending downwardly from collar 96 is a connector 98 to the lower end of which is connected a clamping member such as clamp block 100 which encircles, apart from gap 101, seat column 92. The clamp block is generally rectangular in external configuration and has formed therein an opening 102 (shown in phantom lines in FIG. 10) of a diameter slightly larger than that of tubular sleeve 93. Opening 102 may flare outwardly as shown in FIG. 10 to facilitate the entry of sleeve 93 into the opening. A nylon bushing 104 is slidably provided between clamp block 100 and seat column 92.

When it is desired to install the swivel seat, column 92 is guided into sleeve 93 and lowered thereinto. As the column is dropped further into the sleeve, the leading or upper end of the sleeve enters opening 102 and envelops the lower portion of bushing 104. The sleeve comes to rest against the outwardly extending flanged portion of bushing 104 which acts as a friction reducing bearing between the sleeve and collar 96 to facilitate the swiveling motion of the seat.

The clamp actuating mechanism includes lever 91 which is fixedly connected to a spacer 105. Spacer 105 extends downwardly and receives through its lower end a rod member such as a set screw 106. Set screw 106 extends into a cavity 107 formed into side of lobe 113 of clamp block 100. On the opposite side of clamp block 100 another spacer 109 is fixedly connected to lever 91. Spacer 109 is pivotally connected at its lower end to one end of pivot rods 110. The other ends of the pivot rods are pivotally connected to a projection 111 formed integrally onto lobe 114 of clamp block 100.

In the unclamped position, as shown by solid lines pivot rods 110 project upwardly at an acute angle to column 92 whereas set screw 106 projects slightly downwardly to define an acute angle with sleeve 93.

As lever 91 is depressed, rods 110 assume a more horizontal position as does set screw 106. The resulting convergence of pivot rods 110 and set screw 106 compresses clamp block 100 and more particularly causes a narrowing of gap 101. A clamping force is thereby exerted upon nonrotatable sleeve 93. It will be appreciated that clamp block 100 is anchored to collar 96 which is fixedly connected to column 92. Further rotation of seat column 92 is thusly prevented. It will be further appreciated that as lobe 113 is held stationary by connector 98, it is lobe 114 which moves inwardly in response to the depression of clamp lever 91. The downward extent of travel of lever 91 is limited by contact between the lever and the outer corner of projection 111. In this regard, set screw 106 is adjusted so that lever 91 tends to snap into the clamped position as it makes contact with projection 111.

To release the clamp, it is merely necessary to pull upwardly on lever 91. A ball knob may be fitted to the end of the lever to facilitate its operation.

An alternative clamp configuration may be as follows. Set screw 106 may be eliminated in favour of a bracket (not shown) affixed to lobe 113 of clamp block 100 to project upwardly therefrom. The end of lever 91 is pivotally received into the bracket. Lever 91 is connected to pivot rods 110 in the manner shown in FIG. 10. Accordingly, by depressing lever 91, rods 110 are pivoted into a more nearly horizontal position, causing movement of lobe 114 towards lobe 113 which is held stationary by connector 98.

Figure 12:
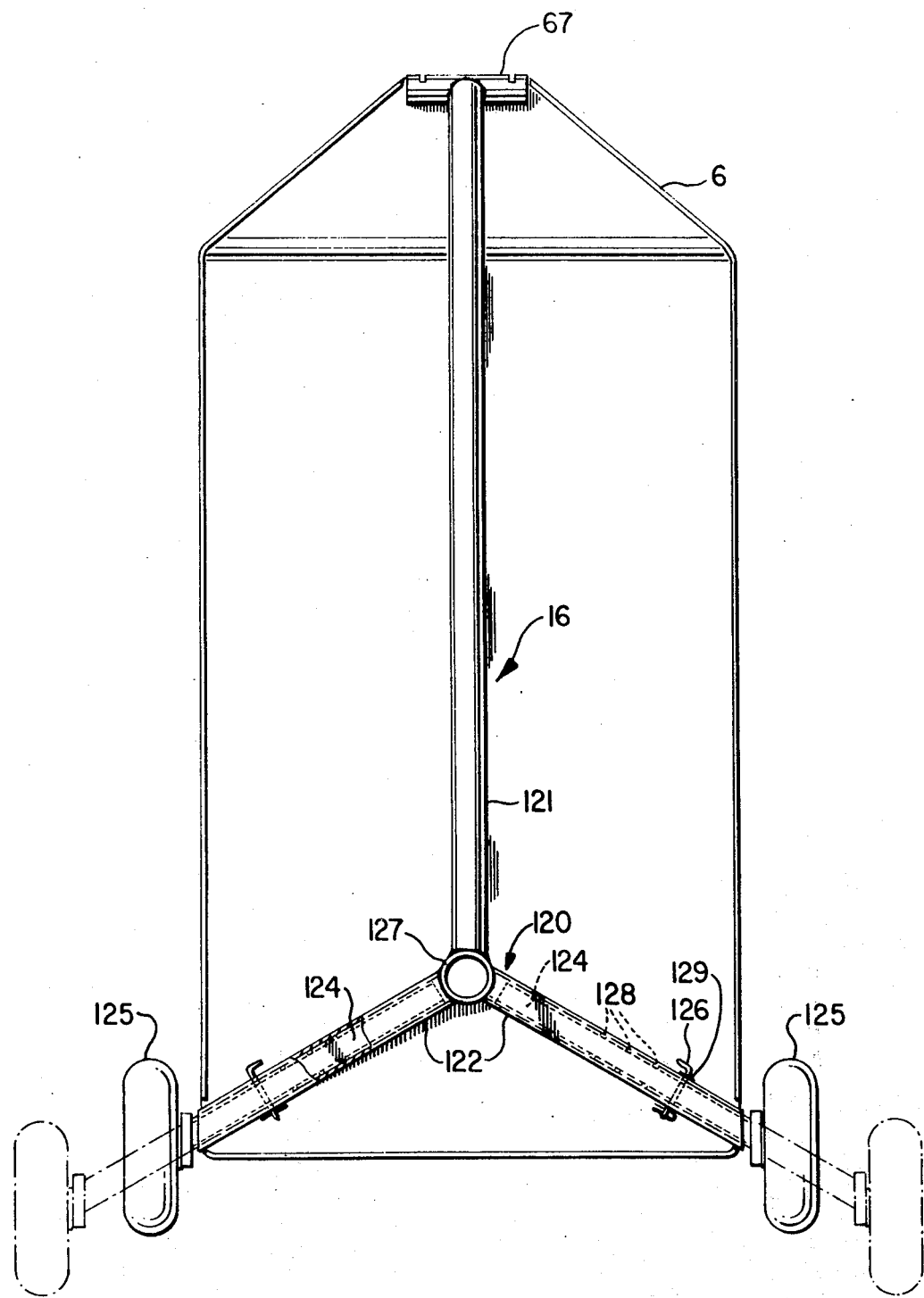
FIG. 12 is a bottom plan, partially sectional, view of the frame of the wheelchair of FIG. 1.

Referring now to FIG. 12, there is shown in plan view wheel chair frame 16, including V-shaped telescopic rear axle 120. The frame also includes tubular member 67 which cooperates with and forms a part of latch assembly 11 and member 121 which runs along the length of platform 3. Frame member 121 is bent upwardly to conform to the shape of running board 6 (FIG. 1). The frame may be glued to the platform or affixed thereto by any other suitable means.

As mentioned previously, wheelchairs of the type described herein typically possess a high centre of gravity and suffer a further instability by virtue of the concentration of so much weight over the rear axle, including the weight of the operator. It will be appreciated, therefore, that great care must be taken to avoid inclines beyond a threshold grade lest the wheelchair begin to tip over rearwardly. Similar problems are encountered when the direction of travel is normal to the grade, the tendency then being to tip over sideways. To overcome the latter problem, known wheelchairs have offered outriding bogey wheels and an additional axle or axle extensions to support them. The problem with such accessories lies in the inconvenience of their installation as well as problems of transporting and storing these accessories when not in use. No solutions have been offered which overcome the problem of rearward instability.

Referring once more to FIG. 12, both problems have been overcome by providing a telescopic rear axle assembly 120 which radiates outwardly and rearwardly from a hub 127. Fixed axle housings 122 are securely fastened to the frame whereas adjustable axles 124 are slidably received within housings 122. Wheels 125 are mounted about the outer ends of axles 124 in any known fashion. Adjustable axles 124 are held in position by means of removable pins 126. A plurality of pairs of axially aligned apertures 128 are formed in axles 124. Apertures 128 may be brought into alignment with axially aligned apertures 129 formed into housings 122, thereby providing adjustability to the degree of extension of axles 124. It will be appreciated, of course, that the extension of axles 124 results not only in a widening of the wheelchair's track but also in a lengthening of its wheelbase, adding greatly to the chair's stability without the necessity for becoming involved in the handling of oiled parts or special tools.

Figure 13:
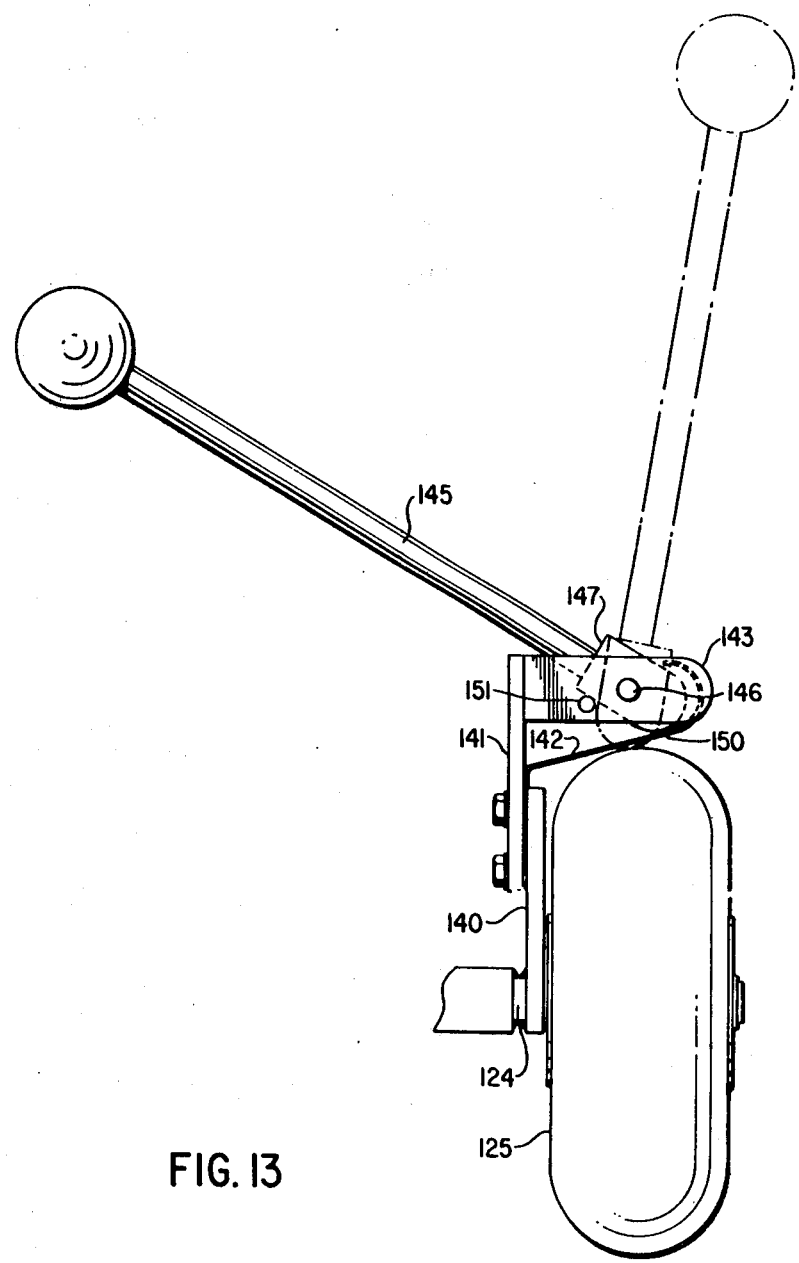
FIG. 13 is a front elevational view of a rear brake assembly for use on the wheelchair of FIG. 1.
Figure 14:
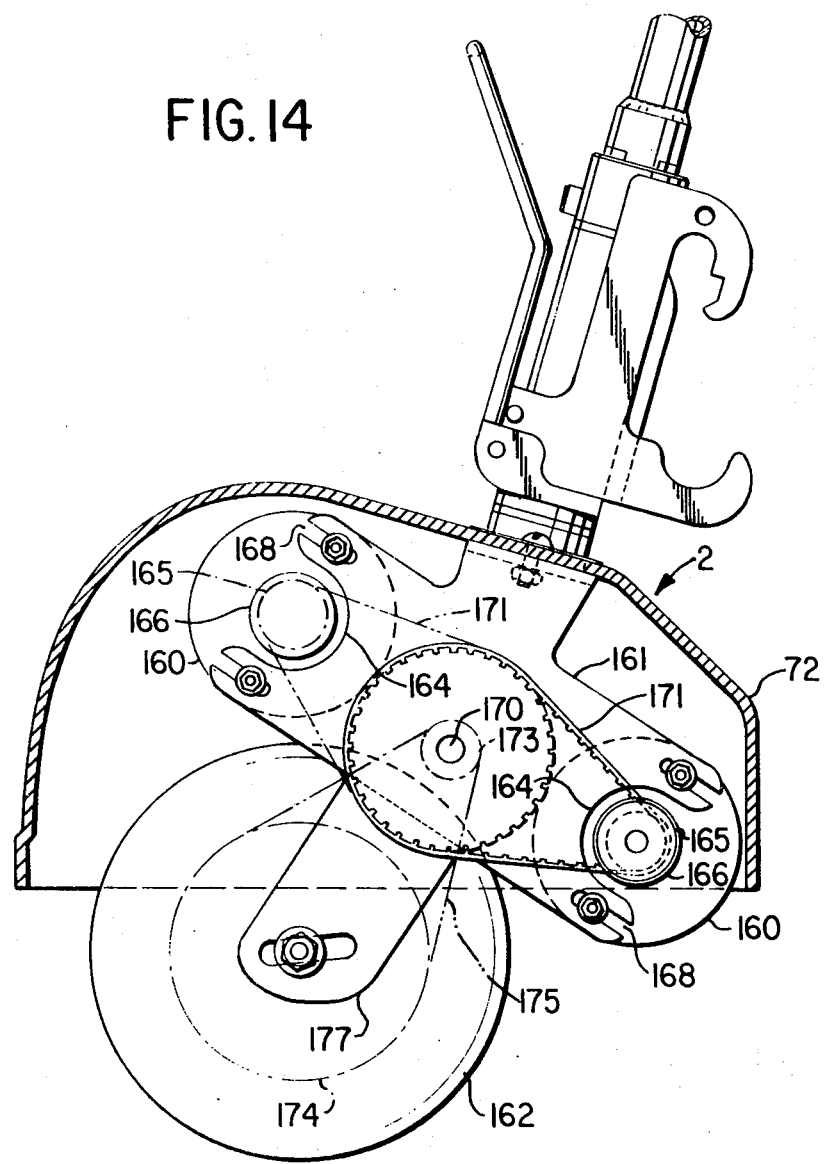
FIG. 14 is a side elevational, partially sectional view of the power head of the wheelchair of FIG. 1.

To co-operate with the telescopic capabilities of the rear axle, a new, easy to operate, outboard parking brake assembly has been developed, an embodiment of which is depicted in FIG. 13.

A brake mount 140 is rigidly affixed to one of adjustable axles 124 proximal the outer end thereof, adjacent to the inner periphery of wheel 125. Accordingly, the brake mount and the remainder of the assembly attached thereto will move in and out with displacements of axle 124. A bracket 141 is affixed to mount 140. Sandwiched between the bracket and the mount is a strip of spring steel 142 which inclines upwardly and outwardly over wheel 125 at an oblique angle thereto. The end of spring 142 is curled and is enclosed within housing 143 affixed to bracket 141. Housing 143 extends horizontally over wheel 125.

Brake lever 145 is pivotally mounted about pin 146. More specifically, brake cam 147, affixed to the end of the brake lever, rotates in an eccentric fashion about pin 146. Cam surface 150 of cam 147 engages spring 142 and is rounded to smoothly cooperate therewith. When lever 145 is rotated into its locked position against pin 151 and the curled portion of spring 142, as illustrated by phatom lines in FIG. 13, cam 147 depresses spring 142 to bind wheel 125, thereby preventing any rotation of the wheel. It will be appreciated that the intervention of spring 142 between the cam and the wheel further serves to protect the wheel from penetration by the cam. In the released position, lever 145 is maintained in an inclined position by stop 151. It will be appreciated that in the locked position thereof brake lever 145 projects upwardly and somewhat outwardly from the wheelchair so as to be clearly visible to the operator seated above the brake. The operator can therefore easily and readily determine the operative state of the brake in marked contrast to known brakes which do not offer a readily discernable visual impression of their operativeness.

A ball knob may be provided at the outer end of lever 145.

The present invention further contemplates improvements to power head 2 itself. In particular, it has been found advantageous from both a functional and a cost point of view to employ two relatively small readily obtainable 12 volt motors to provide power rather than one larger, more costly motor. The use of two motors yields added torque. Additionally, the use of two 12 volt motors in series facilitates the use of a 24 volt power supply with the result that the current which need flow through the speed controls can be cut. With reduced currents, the use of modern, smooth operating solid state controls becomes viable, particularly the use of known pulse width modulated electronic controls. The use of such controls allows for infinite power feed, smooth acceleration and an infinite choice of operating speeds. Some known wheelchairs offer a choice of only two forward speeds, slow and fast.

To accomodate two drive motors within cowling 72, a motor bracket 161 has been developed which is fixedly connected to cowling 72 and more particularly to plate 71 which is connected to the cowling (FIG. 3). The lower ends 177 of the bracket are hook shaped. Drive wheel 162 is rotatably mounted therebetween in any suitable known fashion. A second intermediate portion of the bracket is inclined relative to the ground and has formed into each end thereof an opening 164 providing clearance for each motors' rotor cowling 166 and drive gear 165. Slots 168 are formed into the bracket to receive the motor mounting hardware. It will be appreciated that the tension in drive belts 171 may be adjusted by the repositioning of the motor mounts within slots 168.

Figure 15:
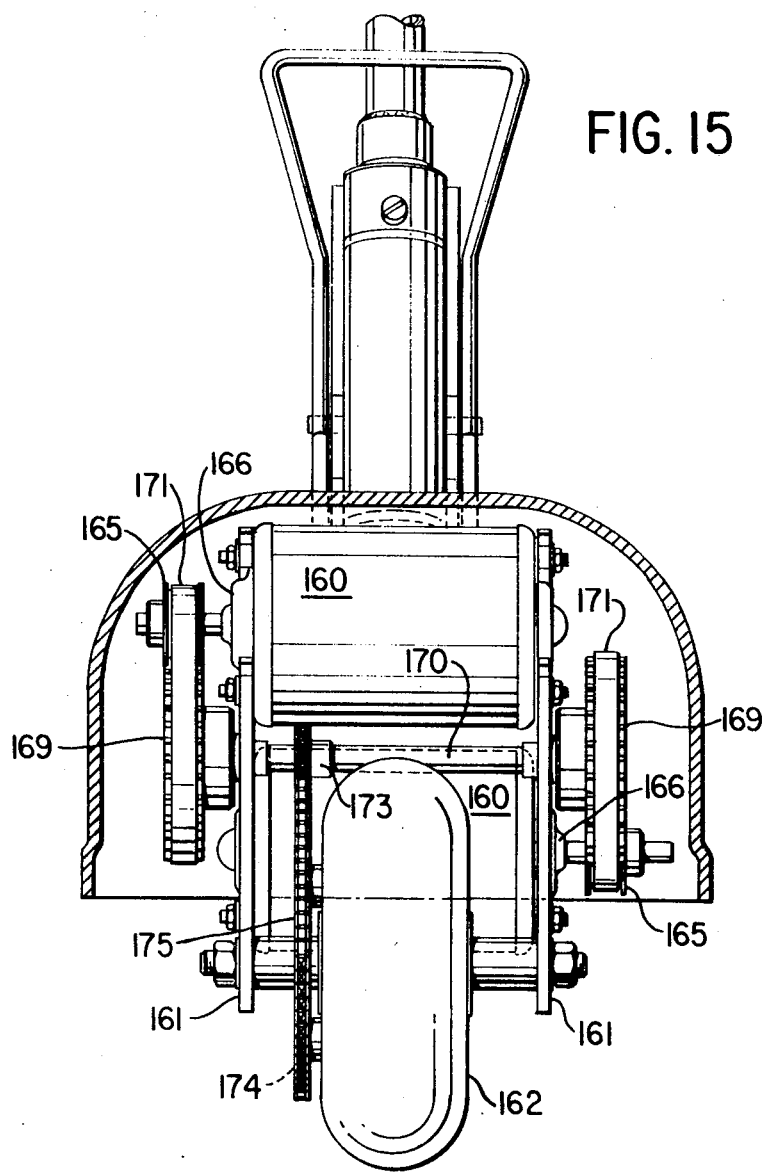
FIG. 15 is a front elevational view of the power head of FIG. 14.

With reference to FIG. 15, it will be observed that motors 160 are mounted so that their rotors project in opposite directions, that is, power is taken from the left side of the uppermost motor and from the right side of the lowermost motor. Accordingly, pulleys 169 are provided on both ends of common drive shaft 170 to receive power from drive belts 171. Power is transmitted to drive wheel 162 via sprockets 173 and 174 and chain 175.

It will be appreciated that the use of a bracket as described hereinabove results in a relatively compact power head of light weight. Again, although the use of such a bracket has been described in the context of an electrified wheelchair, such a drive assembly may find application on all manner of motorized carts or vehicles of similar dimensions.

We claim:

1. A vehicle which can be disassembled into a forwardly extending wheel assembly and a rearwardly extending trailer by means of a connecting assembly disposed therebetween, the connecting assembly comprising:
   latch means provided on said trailer;
   hook means provided on said wheel assembly to be mutually engageable with said latch means, said hook means including;
   (a) engaging means to engage and lift said latch means and having formed thereon shoulder means to cause the progressive disengagement of said engaging means from said latch means during the lifting thereof;
   (b) support means to engagedly receive said latch means upon disengagement thereof from said engaging means to secure coupling of said wheel assembly and said trailer together; and
   (c) lever means actuatable to cause disengagement between said latch means and said support means.

2. The vehicle of claim 1 wherein said latch means include a latch plate member having a front and rear surface arranged perpendicular to said engaging and support means and a tubular member connected to said rear surface to be receivable into said support means upon disengagement of said engaging means from said latch means such that said support means thereupon engagedly support said latch means.

3. The vehicle of claim 2 wherein a notch is formed into said rear surface of said latch plate member to receive and co-operate with said engaging means such that a lifting of said engaging means results in a lifting of said latch means.

4. The vehicle of claim 3 further including: a tubular sleeve member; first and second parallel plate members fixed to opposite sides of said tubular sleeve member to be parallel to the longitudinal axis thereof, said plate members having first upper and second lower ends; and a transverse plate member extending between said first and second plates; wherein said engaging and support means project from said first and second ends, respectively, of each of said first and second plates in a direction towards said latch means.

5. The vehicle of claim 4 wherein said engaging means projecting from said first ends of said parallel plate members comprise a downwardly hooking arm, the inner surface of which defines an opening between said engaging means and the parallel plate member from which it projects, said arm having a recess formed proximal to the lower end thereof which opens into the periphery of said opening, the upper surface of said recess intersecting the periphery of said opening at substantially a right angle thereto to define said shoulder means, the lower surface of said recess tapering towards said second end of said parallel plate member and intersecting the outer surface of said arm to define a projection extending slightly into said opening towards said parallel plate member.

6. The vehicle of claim 5 wherein said support means projecting from said second ends of said parallel plate members comprise an upwardly hooking arm to receive and support said tubular member, the extent of curvature of said arm being such as to envelop slightly more than half of said tubular member.

7. The vehicle of claim 6 wherein said projection is receivable into and engageable with said notch upon lifting of said engaging means relative to said latch means to cause a simultaneous lifting of said latch means.

8. The vehicle of claim 7 wherein, upon continued lifting of said engaging means, said shoulder means contact the rear surface of said latch plate member to commence said progressive disengagement of said projection from said notch.

9. The vehicle of claim 8 including handle means having said lever means connected thereto, said handle means being pivotally connected to said first and second parallel plate members such that said lever means are disposed externally about the lower ends of said first and second plate members to extend in a direction towards said latch means.

10. The vehicle of claim 9 wherein said latch means include third and fourth plate members affixed thereto to receive said first and second plate members therebetween when said hook and latch means are in the engaged position thereof.

11. The vehicle of claim 10 wherein, in said engaged position of said hook and latch means, said lever means are disposed immediately adjacent to the lower ends of said third and fourth plate members such that actuation of said lever means via said handle means results in an upward displacement of said third and fourth plate members, and hence of said latch means, relative to said hook means.

12. The vehicle of claim 11 wherein said third and fourth plate members are affixed to opposite sides of said latch plate member.

13. The vehicle of claim 12 wherein longitudinally extending slots are formed through said latch plate member adjacent the lower end thereof to permit the passage therethrough of said support means.

14. The vehicle of claim 13 wherein said tubular member includes slots formed therein adjacent to and aligned with said longitudinally extending slots formed through said latch plate member to facilitate the passage of said support means.

15. The vehicle of claim 14 wherein said transverse plate member extends substantially vertically from a point adjacent the lower ends of said first and second parallel plate members upwardly to a point laterally opposite said shoulder of said engaging means.

16. The vehicle of claim 15 wherein the upper edge of said transverse plate member is rounded.

17. The vehicle of claim 16 wherein said latch plate member extends vertically from a point laterally opposite the lower ends of said first and second plate members upwardly to a point laterally opposite said projection of said engaging means.

18. The vehicle of claim 17 wherein the upper edge of said latch plate member is rounded.

19. The vehicle of claim 11 wherein, in said engaged position, said latch plate member and said transverse plate members are in substantially flush contact with one another.

20. The vehicle of claim 1 including swivel seat means provided on said trailer by means of first and second telescopically associated tubular members, and a clamping mechanism operable to lock said seat means by preventing the rotation of said first tubular member relative to said second tubular member, the clamping mechanism comprising:
  collar means connectable to said first tubular member to be rotatable therewith;
  a clamping member adapted to partially encircle said second tubular member for rotation thereabout;
  means rigidly interconnecting said collar means and said clamping member for positioning said clamping member about said second tubular member;
  rod means pivotally connected to and projecting outwardly from one side of said clamping member at an incline relative to the longitudinal axis of said tubular members and in a direction towards said collar means; and
  lever means pivotally interconnected between the side of said clamping member opposite to said one side thereof and the outwardly extending portion of said rod means, wherein said lever means are actuatable in the plane of said longitudinal axis to increase the angle of incline of said rod means relative to said axis, thereby causing said clamping member to constrict about said second tubular member to prevent the rotation of said first tubular member relative to said second tubular member.

21. The vehicle of claim 20 including second rod means pivotally connected to and projecting outwardly from said opposite side of said clamping member, said second rod means extending at an incline relative to said longitudinal axis in a direction away from said collar means, wherein said lever means are connected to said second rod means to be pivotally connected thereby to said opposite side of said clamping member.

22. The vehicle of claim 21 wherein said swivel seat is fixedly connected to one end of said first tubular member, the other end of which is rotatably received within said second tubular member such that the longitudinal axis of said members are aligned in the vertical plane.

23. The vehicle of claim 22 wherein said clamping member has a gap formed therethrough, said gap being formed at a point intermediate to the points of connection of said first and second rod means to said clamping member.

24. The vehicle of claim 23 including first and second space means fixedly connected to said lever means and extending therefrom for connection to said first and second rod means, respectively.

25. The vehicle of claim 24 wherein said second rod means threadedly engage said second spacer means for adjustments to the point of connection of said second spacer means to said second rod means.

26. The vehicle of claim 25 wherein the point of connection of said collar means to said first tubular member is adjustable 27. The vehicle of claim 1 including a brake to prevent the rotation of a wheel mounted to said trailer, the brake comprising:
   brake mounting means provided adjacent said wheel;
   a cam member pivotally supported by said mounting means, said cam member being actuatable between a wheel braking and a wheel releasing position; and
   resilient means disposed between said cam member and the wheel such that in said braking position of said cam member, said cam member urges said resilient means into frictional engagement with said wheel.

28. The vehicle of claim 1 wherein said trailer includes a telescopic rear axle assembly, said axle assembly comprising, when viewed in plan:
   a V-shaped axle housing, the arms of said V extending towards the rearmost corners of the trailer; and
   an axle member having a vehicle supporting wheel rotatably affixed to the outer end thereof slidably adjustable within each of said arms forming said housing, said axle member being adjustable within said arm between a fully retracted and a fully extended position to simultaneously vary the wheel base and the track of said vehicle.

29. The vehicle of claim 28 wherein each of said axle members includes a plurality of pairs of axially aligned holes formed therein and each arm of said axle housing has axially aligned apertures formed therein, said pairs of holes being alignable with said apertures to receive a retractable pin member therethrough for fixing the position of said axle member within said arm.

30. The vehicle of claim 1 wherein said wheel assembly includes a mount to support first and second drive motors adjacent the wheel of said wheel assembly, said motor mount comprising:
   bracket means including a first lower portion to support the wheel and a second portion disposed above the wheel at an angle relative thereto, said second portion being adapted at its ends to connectably receive the motors;
   driveshaft means disposed between said first and second drive motors and connected thereto for rotation of said drive shaft means; and
   connecting means disposed between the drive shaft means and the wheel to transmit power to the wheel.

31. The vehicle of claim 30 wherein said first and second drive motors, each of which includes a rotor extending axially outwardly therefrom, are mounted onto said ends of said second portion such that said rotors are aligned parallel to the axis of said wheel and extend in opposite directions to one another.

32. The vehicle of claim 31 wherein said oppositely extending rotors of said first and second motors are respectively connected to opposing end portions of said drive shaft means.

33. The vehicle of claim 22 wherein said collar means abut the end of said second tubular member into which said first tubular member is received to control the combined length of said first and second tubular members, said clamping mechanism further including a friction reducing bearing disposed between said collar means and said end of said second tubular member to facilitate the relative rotation thereof.

34. The vehicle of claim 33 further including a friction reducing bushing disposed between said first and second tubular members, said bushing including an outwardly extending flange portion which forms said friction reducing bearing.

35. The vehicle of claim 27 wherein said cam member is pivotable in the plane of the axis of rotation of said wheel.

36. The vehicle of claim 35 wherein said brake mounting means include housing means affixed thereto, said housing means being disposed radially outwardly from said wheel and extending in a direction parallel to the axis of rotation of said wheel.

37. The vehicle of claim 36 wherein said housing means include a pin member, said cam member being pivotally disposed about said pin member for rotation in said plane of the axis of rotation of said wheel.

38. The vehicle of claim 37 wherein said cam member is actuatable between said wheel braking and wheel releasing positions thereof by means of a lever connected to said cam member.

39. The vehicle of claim 38 wherein said lever affixed to said cam member also moves in said plane of the axis of rotation of said wheel, said lever projecting radially inwardly of said wheel in the wheel releasing position thereof and radially upwardly and outwardly of said wheel in the wheel braking position thereof to provide a visual indication of the operative state of said brake.

40. The vehicle of claim 39 wherein said housing means include a second pin member to support said lever in the wheel releasing position thereof and to contact said cam member to prevent the overrotation of said cam member beyond the wheel braking position of said lever connected to said cam member.

41. The vehicle of claim 40 wherein said wheel is rotatably mounted about an axle and said brake mounting means are fixed to said axle, said axle being extensible in the longitudinal direction thereof such that said brake mounting means move with said axle to remain adjacent said wheel.

42. The vehicle of claim 29 including brake means affixed to at least one of said axle members adjacent an inner surface of said vehicle supporting wheel such that said brake means move with adjustment to the position of said axle member to remain adjacent said wheel, said brake means being adapted to permit the rotation of said vehicle supporting wheel and comprising; brake mounting means provided adjacent said wheel; a cam member pivotally supported by said mounting means, said cam member being actuatable between a wheel braking and a wheel releasing position and resilient means disposed between said cam member and said wheel such that in the braking position of said cam member, said cam member urges said resilient means into frictional engagement with said wheel.

43. A connecting assembly for a light-weight vehicle, said assembly having mutually engageable hook and latch means wherein said hook means comprises:
   engaging means to engage and lift said latch means, said engaging means having formed thereon shoulder means to cause the progressive disengagement of said engaging means from said latch means during the lifting thereof;
   support means to engagedly receive said latch means upon disengagement thereof from said engaging means to secure coupling of said hook and latch means together; and lever means actuatable to cause disengagement between said latch means and said support means.

44. The assembly of claim 43 wherein said latch means include a latch plate member having a front and rear surface arranged perpendicular to said engaging and support means and a tubular member connected to said rear surface to be receivable into said support means upon disengagement of said engaging means from said latch means such that said support means thereupon engagedly support said latch means.

45. The assembly of claim 44 wherein a notch is formed into said rear surface of said latch plate member to receive and co-operate with said engaging means such that a lifting of said engaging means results in a lifting of said latch means.

46. The assembly of claim 45 further including: a tubular sleeve member; first and second parallel plate members fixed to opposite sides of said tubular sleeve member to be parallel to the longitudinal axis thereof, said plate members having first upper and second lower ends; and a transverse plate member extending between said first and second plates; wherein said engaging and support means project from said first and second ends, respectively of each of said first and second plates in a direction towards said latch means.

47. The assembly of claim 46 wherein said engaging means projecting from said first ends of said parallel plate members comprise a downwardly hooking arm, the inner surface of which defines an opening between said engaging means and the parallel plate member from which it projects, said arm having a recess formed proximal to the lower end thereof which opens into the periphery of said opening, the upper surface of said recess intersecting the periphery of said opening at substantially a right angle thereto to define said shoulder means, the lower surface of said recess tapering towards said second end of said parallel plate member and intersecting the outer surface of said arm to define a projection extending slightly into said opening towards said parallel plate member.

48. The assembly of claim 47 wherein said support means projecting from said second ends of said parallel plate members comprise an upwardly hooking arm to receive and support said tubular member, the extent of curvature of said arm being such as to envelop slightly more than half of said tubular member.

49. The assembly of claim 48 wherein said projection is receivable into and engageable with said notch upon lifting of said engaging means relative to said latch means to cause a simultaneous lifting of said latch means.

50. The assembly of claim 49 wherein, upon continued lifting of said engaging means, said shoulder means contact the rear surface of said latch plate member to commence said progressive disengagement of the projection from said notch.

51. The assembly of claim 50 including handle means having said lever means connected thereto, said handle means being pivotally connected to said first and second parallel plate members such that said lever means are disposed externally about the lower ends of said first and second plate members to extend in a direction towards said latch means.

52. The assembly of claim 51 wherein said latch means include third and fourth plate members affixed thereto to receive said first and second plate members therebetween when said hook and latch means are in the engaged position thereof.

53. The assembly of claim 52 wherein, in said engaged position of said hook and latch means, said lever means are disposed immediately adjacent to the lower ends of said third and fourth plate members such that actuation of said lever means via said handle means results in an upward displacement of said third and fourth plate members, and hence of said latch means, relative to said hook means.

54. The assembly of claim 53 wherein said third and fourth plate members are affixed to opposite sides of said latch plate member.

55. The assembly of claim 54 wherein longitudinally extending slots are formed through said latch plate member adjacent the lower end thereof to permit the passage therethrough of said support means.

56. The assembly of claim 55 wherein said tubular member includes slots formed therein adjacent to and aligned with said longitudinally extending slots formed through said latch plate member to facilitate the passage of said support means.

57. The assembly of claim 56 wherein said transverse plate member extends substantially vertically from a point adjacent the lower ends of said first and second parallel plate members upwardly to a point laterally opposite said shoulder of said engaging means.

58. The assembly of claim 57 wherein the upper edge of said transverse plate member is rounded.

59. The assembly of claim 58 wherein said latch plate member extends vertically from a point laterally opposite the lower ends of said first and second plate members upwardly to a point laterally opposite said projection of said engaging means.

60. The assembly of claim 59 wherein the upper edge of said latch plate member is rounded.

61. The assembly of claim 60 wherein, in said engaged position, said latch plate member and said transverse plate members are in substantially flush contact with one another.

* * * * *